Dec. 6, 1955  J. J. SHIELDS  2,725,974
CONVEYOR ROLLERS
Filed Sept. 30, 1954
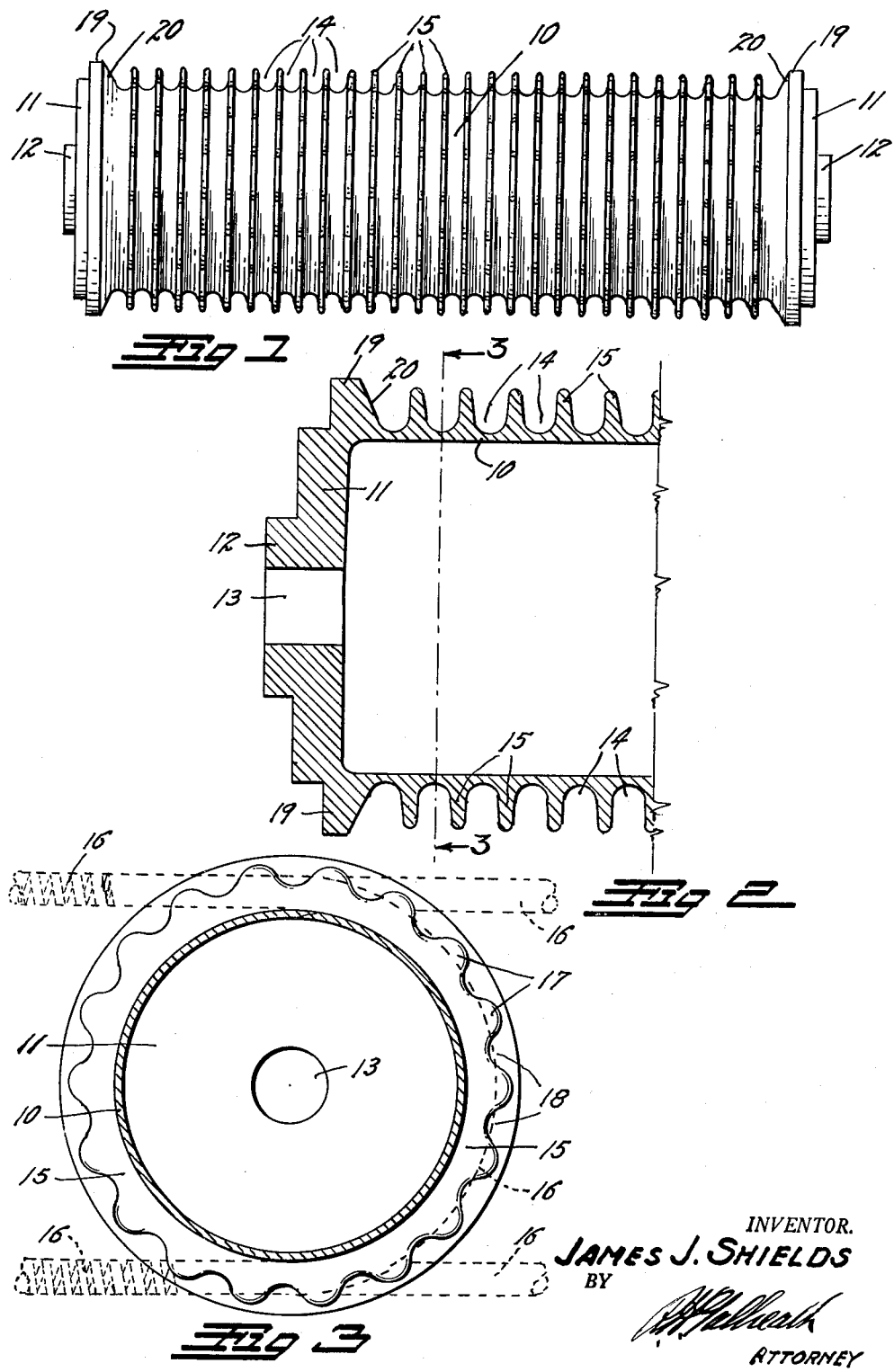
INVENTOR.
JAMES J. SHIELDS
BY
ATTORNEY

United States Patent Office 2,725,974
Patented Dec. 6, 1955

2,725,974

CONVEYOR ROLLERS

James J. Shields, Denver, Colo.

Application September 30, 1954, Serial No. 459,337

1 Claim. (Cl. 198—190)

This invention relates to a roller for conveyors of the type employing a plurality of endless belts or springs, such as illustrated in applicant's prior Patents Nos. 2,260,587; 2,490,381, and 2,682,216, and in applicant's co-pending application Serial No. 336,736. Conveyors of this type employ a plurality of spaced-apart, grooved rollers with a plurality of parallel endless belts or springs extending in spaced-apart relation from roller to roller, the belts or springs on each roller alternating in direction so that each alternate belt or spring will extend to a roller at one side and the intermediate belts or springs will extend to a roller on the opposite side.

It has been found that if the conveyors are set at a relatively steep incline, articles being conveyed have difficulty in traveling from the belts or springs approaching a roller to the belts or springs extending to the next successive roller. They will often come to rest over a roller or will be so retarded in their passage thereover as to allow the belts or springs to damage the coverings of the articles unless the latter are manually pushed across the roller.

The principal object of this invention is to provide a roller for this type of conveyor which will act in the nature of a conveyor itself so as to engage articles leaving the approaching belts or springs and carry them over onto the departing belts or springs so as to prevent the articles from coming to rest over the roller, regardless of the incline of the conveyor.

Another object is to provide an article carrying roller which will act simultaneously to maintain the conveyor belts or springs in their proper spaced relation, and to engage in carrying articles over the roller without damage to the articles or their wrappings or containers.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved article-carrying conveyor roller;

Fig. 2 is an enlarged, fragmentary, longitudinal section, through one extremity of the roller of Fig. 1; and Fig. 3 is a cross-section taken on the line 3—3, Fig. 2, illustrating in broken line the positions of the belts or springs relative to the improved roller.

The improved roller is formed with a hollow, cylindrical barrel 10 having closed ends 11 at its opposite extremities. The ends 11 are formed with shaft bosses 12 through which axial shaft openings 13 extend for the reception of a supporting conveyor roller shaft. The cylindrical surface of the roller is formed with a plurality of uniform, spaced-apart, spring-receiving grooves 14 separated by relatively thin, annular partition flanges or ridges 15.

The grooves 14 are designed to receive round belts or endless coil springs, such as indicated in broken line at 16 in Fig. 3. The transverse radius of the bottoms of the grooves 14 is substantially equal to the radius of the springs 16.

The ridges 15 are formed with a plurality of rounded protuberances 17 separated by arcuate valleys or sockets 18. The partition ridges 15 extend radially outward from the barrel 10 sufficiently to extend beyond the outer radius of the springs 16 so that the protuberances 17 will project upwardly and outwardly beyond the conveying plane of the plurality of springs 16, as shown in Fig. 3. It will be noted that since the ridges project above the conveying plane, they will engage articles traveling from the springs at one side of the roller and carry them to the springs at the other side of the roller, as can be seen with reference to the relative positions of the broken and solid lines in Fig. 3.

The radii of the arcuate protuberances 17 correspond to the radii of the intermediate arcuate valleys or sockets 18 so as to produce a smooth, unbroken, undulating circumference on the partition ridges to prevent damage to articles traveling in either direction on the conveyor across the various rollers. The partition ridges are not only smoothly rounded in a circumferential direction, but are also smoothly rounded transversely of the ridges so as to avoid all sharp or abrupt surfaces which might damage articles being conveyed.

Each extremity of the improved roller is provided with a terminal flange 19, and the diameters of these terminal flanges exceed the extreme outer diameters of the intervening partition ridges so as to tend to prevent articles being conveyed from traveling over the sides of the conveyor. The terminal flanges are formed with inclined inner surfaces 20 which act to engage and gently force articles toward the axis of the conveyor.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A roller for conveyors of the type having a plurality of endless conveying members extending oppositely outward from a roller in alternate directions and in closely spaced relation to form a conveying plane, comprising: a cylindrical barrel; a plurality of spaced-apart, circumferential grooves in the outer cylindrical surface of said barrel for receiving said endless springs; a plurality of spring spacing ridges formed on said barrel, said ridges being positioned between adjacent grooves on said barrel and extending radially outward from the latter sufficiently far to project beyond the conveying plane of said endless conveying members when the latter are in position in said grooves; a plurality of spaced-apart protuberances formed about the circumference of each spacing ridge separated by intervening valleys or notches, said protuberances extending radially beyond the conveying plane of said conveying members in said grooves, said valleys extending radially inward below the conveying plane of said conveying members; an end flange formed on each extremity of said roller, the diameters of said end flanges exceeding the diameters of said protuberances; and a conical, annular, inclined surface on the inside faces of each end flange which will act to urge articles toward the medial portion of said roller.

References Cited in the file of this patent

UNITED STATES PATENTS

| 636,762 | Conley | Nov. 14, 1899 |
|---|---|---|
| 1,299,198 | Low et al. | Apr. 1, 1919 |
| 1,956,312 | Browning | Apr. 24, 1934 |
| 1,958,341 | Hurxthal | May 8, 1934 |